Nov. 24, 1953          W. JUDA          2,660,558
METHOD FOR THE PURIFICATION OF WATER BY ION EXCHANGE
Filed Jan. 15, 1949
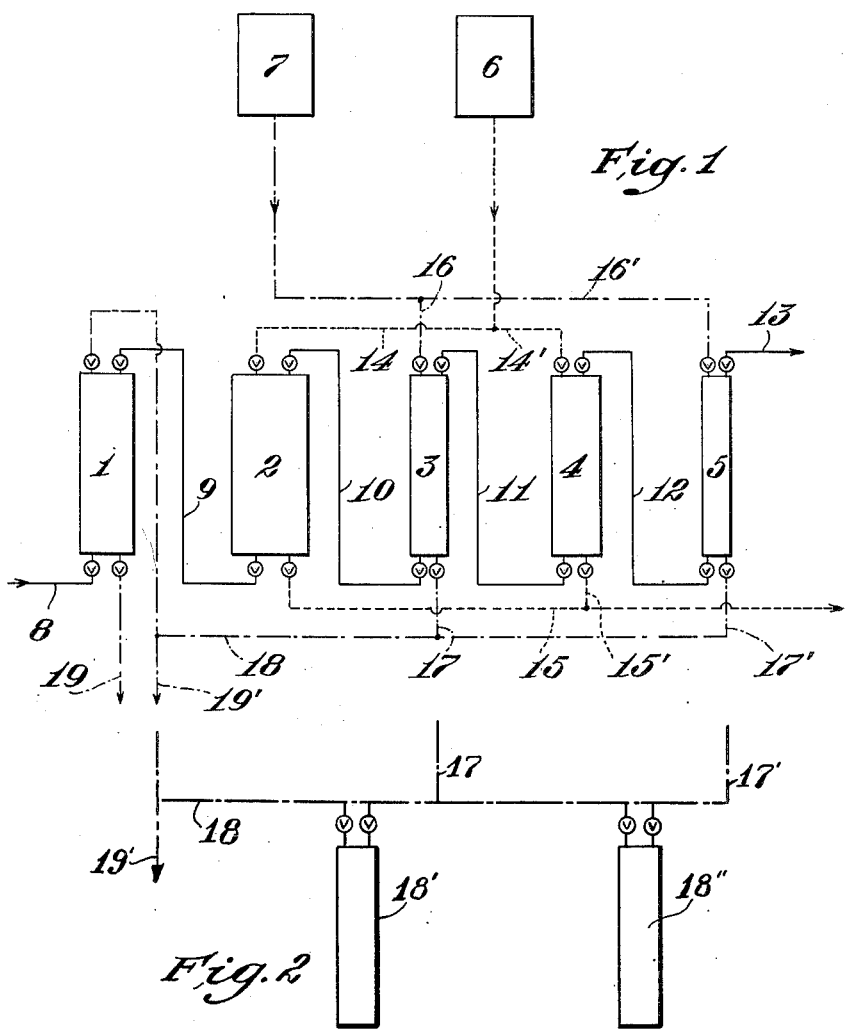
Inventor
Walter Juda
by Roberts, Cushman & Grover
Att'ys Patented Nov. 24, 1953

2,660,558

UNITED STATES PATENT OFFICE 2,660,558

METHOD FOR THE PURIFICATION OF WATER BY ION EXCHANGE

Walter Juda, Cambridge, Mass., assignor to Ionics, Incorporated, Cambridge, Mass., a corporation Application January 15, 1949, Serial No. 71,178

4 Claims. (Cl. 210—24)

This invention relates to the purification of water containing dissolved salts of alkaline earth metals, and possibly also of alkali metals (to include ammonium salts) with a view to removing therefrom the whole or part of such salt contents. The invention is, more particularly, concerned with the problem of rendering natural brackish water potable, but it is to be understood that the applicability of the invention is by no means restricted to this particular field.

The conditioning of water by ion exchange is known. On the one hand it is quite customary to soften hard water thereby that the alkaline earth metal ions responsible for the hardness are exchanged by means of a suitable cation exchanger (hereinafter referred to for short as "calcium exchanger") for sodium or potassium ions. By this process, the hardness of the water is removed to the desired extent, but the water retains equivalent salt contents. On the other hand it is known to remove alkali metal salts from water by successive cation and anion exchangers by means of such cation exchangers as are capable of giving off hydrogen ions in exchange for alkali metal ions (hereinafter referred to for short as "hydrogen exchanger"), and such anion exchangers as are capable of removing acids from aqueous solutions (hereinafter referred to for short as "anion exchanger"). It is equally known that the ion exchangers used for these various purposes can, after exhaustion, be re-constituted by regeneration of the active exchanger material. In the case of the calcium exchanger the regeneration is effected by treatment with the aqueous solution of an alkali metal salt. The hydrogen exchanger is regenerated by treatment with a strong acid, e. g. sulphuric acid. The anion exchanger is regenerated by treatment with a strongly basic aqueous solution, e. g. that of an alkali hydroxide or carbonate. The effluents resulting from the regeneration of these exchangers are commonly wasted unless special methods are followed, as described, for example, in a specification No. 776,143 which is of earlier date than this present specification. In other words, the large amount of chemicals which has to be procured and stored for the regeneration is a net loss in the operation of exchangers of the kind here in question, a loss which makes itself all the more felt since the customary regenerating methods require a considerable excess of the regenerant. Even where special regenerating methods are used, such as that according to the aforesaid specification, with a view to avoiding the necessity of using the regenerant in excess, and also to recovering from some of the effluents a valuable by-product, e. g. alkali sulphate, each type of exchanger requires its own regenerating chemicals, which is a heavy burden on the operation of such exchangers and makes their use in outlying places unduly expensive. The present invention, therefore, has as its object to provide processes for the operation and regeneration of ion exchangers of the kind referred to in such a manner that the amount of regenerating chemicals can be substantially reduced.

With this object in view, the invention consists in a method of purifying brackish water containing a substantial proportion of dissolved alkaline earth metal salts, wherein the water is run successively through one or more calcium exchangers and one or more pairs of exchangers comprising each a hydrogen exchanger and an anion exchanger, and after partial or total exhaustion the exchangers are regenerated, the regeneration of the anion exchangers and calcium exchangers being linked up in such a manner that an alkali metal hydroxide or carbonate solution is first run through the anion exchanger or exchangers, and all or part of the effluent from the latter is run through the calcium exchangers.

In this manner, only two chemicals need be provided for the regeneration of the whole plant, namely, an acid for the hydrogen exchangers, and alkali hydroxide or carbonate (always including the corresponding ammonium compounds) for the anion and calcium exchangers, which means a substantial simplification of the plant and its operation and a cutting down of the operational costs.

The invention also consists in a water purification plant comprising at least one calcium exchanger and at least one pair of hydrogen and anion exchangers, wherein connections are provided for the flow of the water to be purified first through the calcium exchanger or exchangers and then through the hydrogen and anion exchangers of a single pair, or the hydrogen and anion exchangers in alternation where two or more pairs thereof are provided, and other connections are provided on the one hand for the inlet of acid regenerant into the hydrogen exchanger or exchangers and the outlet of the regenerant effluent therefrom, and on the other hand for the inlet of alkaline regenerant into the anion exchangers, and for the outlet therefrom of the regenerant effluent and its conduction into the calcium exchanger or exchangers, and for the outlet from the latter of the spent regenerant.

From another point of view, the invention consists in a method of regenerating anion exchangers by means of aqueous solutions of alakil hydroxide or carbonate wherein the regenerant is passed through the anion exchanger in a direction opposite to that in which the water to be purified flows through the same exchanger in the normal operation thereof. It has been found that in this way the regeneration can be so directed and controlled that the regenerant chemical is used up virtually completely. Thus, for example, where the anion exchanger absorbs from the acid solution passing thereto in the normal course of operation a mixture of sulphuric, hydrochloric and nitric acid, and an aqueous solution of sodium carbonate is used as a regenerant, the regenerant effluent will contain a mixture of sodium sulfate, chloride and nitrate in solution, to the virtual exclusion of carbonate. In contrast thereto, the regeneration of the same anion exchanger by means of the same regenerant, where the latter is passed through the exchanger in the same direction as the water to be purified, requires a considerable excess of the regenerant chemical which is wasted. Where the regenerant effluent of the anion exchangers is used for the regeneration of calcium exchangers disposed in the same purifying plant, as stated above, the regenerant must not contain alkali carbonate or hydroxide since the former would give rise to the formation in the calcium exchanger of insoluble calcium carbonate, while the hydroxide would produce insoluble magnesium hydroxide in case the water to be purified contains magnesium, and either insoluble compound would clog and ruin the exchanger bed. Therefore, the aforesaid method of regenerating the anion exchangers by which virtually all the carbonate or hydroxide used as a regenerant is used up, i. e. converted into alkali salts of the acids formerly absorbed by, and by the regeneration again removed from, the anion exchangers, is particularly useful in connection with the method of regenerating calcium exchangers with the effluent regenerant deriving from the anion exchangers. In the alternative, any excess of carbonate or hydroxide remaining in the effluent regenerant leaving the anion exchangers would have to be converted into the alkali salt of an acid that forms soluble salts with calcium and magnesium by the addition to said effluent of such acid, e. g. hydrochloric or nitric acid.

The invention is illustrated, by way of example only, in the annexed drawings in which:

Fig. 1 is a diagrammatical flow sheet of a plant comprising one calcium exchanger and two pair of hydrogen and anion exchangers, and a storage container each for the acid and alkaline regenerants; and Fig. 2 is a detail of the lower portion of Fig. 1, showing the introduction of collecting tanks in the regenerant effluent line.

The water purification plant here illustrated by way of example and in a diagrammatic way only, comprises a calcium exchanger 1, two hydrogen exchangers 2 and 4, two anion exchangers 3 and 5, an acid regenerant container 6 and an alkaline regenerant container 7. The conduit of the water to be purified is indicated by full lines. It comprises a raw water inlet pipe 8 leading into the bottom part of the calcium exchanger 1. From the top of the latter a pipe 9 leads into the bottom part of the first hydrogen exchanger 2. From the top of the latter a pipe 10 leads into the bottom of the first anion exchanger 3. The top of the latter is connected by pipe 11 to the bottom of the second hydrogen exchanger 4 whose top is connected by pipe 12 to the bottom of anion exchanger 5. Finally, an outflow 13 for the purified water is connected to the top of exchanger 5.

The acid regenerant conduit, which has been shown in dash-dotted lines, leads from the container 6 through parallel pipes 14, 14' into the top parts of the hydrogen exchangers 2 and 4, and parallel effluent pipes 15, 15' are branched off from the bottom parts of the hydrogen exchangers in order to lead the regenerant effluent away, for example for further working up in accordance with the aforesaid specification No. 776,143. The alkaline regenerant pipe system (shown in dash-dotted lines), comprises parallel pipes 16, 16' leading into the top parts of the two anion exchangers, and effluent pipes 17, 17' connected to their bottom parts and merging with a pipe 18 that leads into the top part of the calcium exchanger 1. Finally, a drain pipe 19 for the spent effluent is connected to the bottom of the calcium exchanger, and a second drain 19' is branched off from pipe 18 for the case that a part of the effluent from the anion exchangers is not to be passed through the calcium exchanger.

Valves, indicated in the drawing by a customary symbol, are provided at all points where pipes are connected to the exchangers or branched so that each part of every conduit can be shut off individually.

In the normal purification operation, the valves of the water conduits 8, 9, 10, 11, 12, 13 are open while the valves of the various regenerant pipes are closed. Water is then run through the plant. First it is deprived of the whole or any desired proportion of its calcium and magnesium contents by the exchanger 1 which gives an equivalent amount of sodium or potassium ions off into the solution. The water now containing alkali metal salts thus formed, and possibly also an additional amount thereof originally present in the water, runs through the hydrogen exchanger 2 in which some of the alkali metal ions are exchanged for hydrogen ions. The acid effluent passes into the anion exchanger 3 which removes the acid from the solution substantially completely. Running through the pair of exchangers 4 and 5 the water then undergoes a repetition of the purification cycle it underwent in the exchangers 2 and 3. It is a matter of course that the number of calcium exchangers and of pairs of hydrogen and anion exchangers will have to be selected so as to suit the conditions of each particular site, and also with regard to the degree of purification envisaged. For with a same source of brackish water it may be desirable, under given circumstances, to obtain different degrees of purification of the treated water depending on its intended use; for example, potable water for human consumption or for cattle, water for laundries, or water for irrigation of many different crops and the like, need not necessarily have the same composition.

The methods according to the invention, as described hereinbefore, may be varied according to requirements and circumstances. For example, it may be desirable not to conduct the effluent regenerant direct from the anion exchangers to the calcium exchangers as it leaves the former but first to collect the bulk thereof and then to pass it onwards. In such a case, the regenerant conduits 17, 17', 18 may contain a collecting tank. In Fig. 2 two of such tanks are shown, one designated 18″, to receive regenerant effluent from the exchanger 5, through effluent pipe 17′ (or exchanger 3 through pipe 17) and one designated 18′ to receive regenerant effluent from the exchanger 5 and/or exchanger 3 from effluent pipes 17′ and/or effluent pipe 17. It may also be desirable in some cases to add some alkali salt or acid to the regenerant effluent of the anion exchangers before passing it to the calcium exchanger. This may be done, for example, in the collecting tank aforesaid.

An important advantage obtained by this invention is in all cases that the purification can be carried out by means of a compendious plant and with the use of a minimum of regenerating chemicals.

The following illustrates the above described invention and especially the advantages of passing the solution of the regenerant alkali carbonate (including ammonium carbonate) or alkali hydroxide (including ammonium hydroxide) through the spent anion exchanger bed in the direction opposite to the flow direction of the acid solution which has previously partially exhausted the anion exchanger.

As an operating example, the plant in accordance with the accompanying drawing, comprises: (a) Two hydrogen exchange units (2 and 4, respectively), containing the phenol-sulfonic acid-formaldehyde type cation exchanger, having the structure

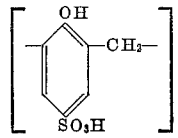

and being known under the trade name of DOWEX 30 (also called NALCITE MX) and described by W. C. Bauman-Industrial and Engineering Chemistry, volume 38, Page 46 (1946) in his article entitled "Improved synthetic ion exchange resin": where he says: "It is a condensation product of o- and p-phenol sulfonic acid with formaldehyde as described by Wassenegger and Jaeger" in their United States Patent 2,204,539 of 1940 assigned to I. G. Farbenindustrie; (b) one sodium exchanger softening unit (1), containing the same material, at least partially in the sodium form; and (c) Two anion exchanger units (3 and 5, respectively), containing the anion exchanger known as Amberlite IR-4B, this product being an amine type of synthetic anion-exchange resin, namely, a condensation product of an amine with an aldehyde, such as formaldehyde and other condensation agents.

The following table shows the amounts of exchanger and the bed dimensions of each unit, in a specific instance of practice of the invention.

TABLE I

| Designation of unit in the drawing | Resin | Weight of resin in pounds | Bed dimensions in feet | |
|---|---|---|---|---|
| | | | Diameter | Depth |
| 1 | Dowex 30 softener (sodium form) | 685.3 | 2 | 4.5 |
| 2 | Dowex 30 partially in hydrogen form | 668.8 | 2 | 4.5 |
| 3 | Amberlite IR-4B | 119.9 | 1 | 4.5 |
| 4 | Dowex 30 partially in hydrogen form | 668.8 | 2 | 4.5 |
| 5 | Amberlite IR-4B | 119.9 | 1 | 4.5 |

The approximate moisture content of the resins is 45 per cent.

Example 1

In a purification run, wherein hard water, containing alkaline earth metal salts was passed through the system until Unit 3 was partially exhausted, that is, a dilute hydrochloric acid solution (about 0.02 normal) was passed with upflow through the unit until the effluent pH had dropped to 6.8 (the initial effluent, after a previous regeneration and washing, had been 8.6).

In a first regeneration for purposes of comparison, the unit was regenerated by means of a 0.73 normal aqueous sodium carbonate solution (about 38.7 g./l.) passed through the unit with upflow.

The unit was then again substantially equally exhausted, but this time the acid solution (which was again about 0.02 normal) was passed through the exchanger with downflow until the pH of the effluent had dropped to 6.45 (the initial effluent, after the previous regeneration and washing, was 8.9). In a second "countercurrent" regeneration the unit was regenerated by means of a 0.72 normal aqueous sodium carbonate solution (about 38.7 g./l.) passed through the unit with upflow.

The following table gives the operating data obtained in the two regenerations.

TABLE II

REGENERATION OF ANION EXCHANGERS BY SODIUM CARBONATE SOLUTIONS]

| Parallel Regeneration | | Countercurrent Regeneration | |
|---|---|---|---|
| Approx. volume 0.73 normal sodium carbonate solution passed into exchangers in liters | pH of effluent after passage of corresponding volume | Approx. volume 0.72 normal sodium carbonate solution passed into exchangers in liters | pH of effluent after passage of corresponding volume |
| 95 | 9.75 | 36 | 3.05 |
| 110 | 9.90 | 50 | 3.25 |
| 150 | 10.5 | 64 | 3.6 |
| 165 | 10.2 | 80 | 5.1 |
| 190 | 10.2 | 94 | 5.8 |
| | | 125 | 6.2 |
| | | 165 | 6.6 |
| | | 216 | 6.6 |
| | | 230 | 9.8 |
| Residual Na$_2$CO$_3$ in 190 liters of combined effluent (per-cent), 49.5%. | | Residual Na$_2$CO$_3$ in 190 liters of combined effluent, negligible. | |

This table shows clearly that the "countercurrent" regeneration resulted in a full utilization of the sodium carbonate, whereas the conventional "parallel" run gave an equal volume of effluent which contained almost half of the initial carbonate unused.

This example illustrates that the countercurrent operation has the advantages of:

(1) great economy of regenerant and space (and equipment) per unit exchanger regenerated; and (2) ease of obtaining substantially carbonate free, neutral sodium salt solutions of the acids held by the spent anion exchanger with equivalent or better regenerating efficiency (compared to parallel operation).

The following examples illustrate the successive regeneration of anion-exchanger and cation-exchanger softener.

Example 2

Use of regenerant solution from anion—exchanger to regenerate exhausted cation—exchanger material:

The parallel regeneration described in Example 1 yielded 190 liters of a mixed sodium carbonate-sodium chloride solution containing about 19 g./l. of $Na_2CO_3$ and 22 g./l. of NaCl. This solution was neutralized with concentrated HCl (to pH 6.6)—because it could not be used directly on account of its carbonate content which would result in the precipitation of insoluble calcium carbonate. It was then passed in downward flow through the partially exhausted cation exchange softener (which contained about 60 equivalents of hardness (as $Ca^{++}$) adsorbed on the exchanger after it had previously been used to soften hard raw water in upward flow through the unit). Then, after thus regenerating and washing, 4,800 liters of water containing about 240 parts per million of hardness (as $Ca^{++}$) were passed through this partially regenerated softener in upward flow before the calcium ion appeared in the effluent (calcium oxalate test).

In a similar run the same hard raw water may be passed downward through the softener after downflow regeneration, and this "parallel" operation would result in somewhat less than half of the output of softened water.

*Example 3*

After the upflow softening operation in unit 1, described in Example 2, the volume of 4,800 liters of water was partially demineralized by passing it through units 2, 3, 4, and 5 in succession as indicated in the drawing. The raw water contained originally a total of about 2,000 parts per million of dissolved salts (as NaCl) and the soft treated water had an average residual salt content of about 700 parts per million.

The "countercurrent" regeneration described in Example 1 was now repeated on the anion exchanger unit 3 and (using for this purpose a 0.72 normal sodium carbonate solution) about 200 liters of substantially carbonate-free sodium chloride solution thus obtained (containing about 40 g./l. of sodium chloride) were fed directly to the top of the softener 1, and passed downward therethrough. In this manner the softener 1 was effectively regenerated (without the necessity of neutralizing residual sodium carbonate or requiring any salt purchased in addition to $Na_2CO_3$) as evidenced by a subsequent upflow softening run similar to that described in Example 2.

In place of sodium carbonate as the regenerant for anion exchangers, I may, of course, use any alkali metal carbonate (including ammonium carbonate) and/or any alkali metal hydroxide (including ammonium hydroxide and ammonia).

I claim:
1. The method of regenerating a calcium exchanger and an anion exchanger of a water demineralization plant which includes a calcium exchanger wherein alkaline earth metals are removed from the water and replaced by an alkali metal or ammonia, a hydrogen exchanger wherein the alkali metal and ammonia are removed from the water and replaced by hydrogen ions, and an anion exchanger wherein acids are removed from the water, comprising the steps of passing an aqueous solution of a regenerant selected from the group consisting of alkali metal and ammonium hydroxides and carbonates through the anion exchanger in a direction opposite to that in which the acidic water flowed therethrough during the exhaustion thereof, so long as an effluent free of both hydroxide and carbonate is discharged therefrom, and passing said effluent through the said calcium exchanger to regenerate same.

2. The method of regenerating a calcium exchanger and an anion exchanger of a water demineralization plant which includes a calcium exchanger wherein alkaline earth metals are removed from the water and replaced by an alkali metal or ammonia, a hydrogen exchanger wherein the alkali metal and ammonia are removed from the water and replaced by hydrogen ions, and an anion exchanger wherein acids are removed from the water, comprising the steps of passing an aqueous solution of a regenerant comprising sodium carbonate through the anion exchanger in a direction opposite to that in which the acidic water flowed therethrough during the exhaustion thereof, so long as an effluent free of sodium carbonate is discharged therefrom, and passing said effluent through the said calcium exchanger to regenerate same.

3. The method of treating brackish waters containing a substantial proportion of alkaline earth metal salts comprising passing the water through a "calcium exchanger" wherein alkaline earth metals are removed and replaced by cations selected from the group consisting of alkali metals and ammonium ions, then through a hydrogen exchanger wherein the alkali metal and ammonium ions are removed and replaced by hydrogen ions, and then through an anion exchanger wherein the acids are removed from the water until said exchangers are at least partially exhausted, and thereafter regenerating said exchangers by passing an aqueous solution of a regenerant selected from the group consisting of alkali metal and ammonium hydroxide and carbonate through the anion exchanger in a direction opposite to that in which the water flowed therethrough during the exhaustion thereof and so long as an effluent free of both carbonate and hydroxide is discharged therefrom, then passing said effluent through the calcium exchanger to regenerate same, and passing an aqueous acid solution through the hydrogen exchanger to regenerate it.

4. The method of treating brackish waters containing a substantial proportion of alkaline earth metal salts comprising passing the water through a "calcium exchanger" wherein alkaline earth metals are removed and replaced by sodium, then through a hydrogen exchanger wherein the alkali metal and ammonium ions are removed and replaced by hydrogen ions, and then through an anion exchanger wherein the acids are removed from the water, until said exchangers are at least partially exhausted, and thereafter regenerating said exchangers by passing an aqueous solution of a regenerant comprising sodium carbonate through the anion exchanger in a direction opposite to that in which the water flowed therethrough during the exhaustion thereof and so long as an effluent free of sodium carbonate is discharged therefrom, then passing said effluent through the calcium exchanger to regenerate same, and passing an aqueous acid solution through the hydrogen exchanger to regenerate it.

WALTER JUDA.

References Cited in the file of this patent
UNITED STATES PATENTS

| Number | Name | Date |
| --- | --- | --- |
| 1,211,735 | Magrath | Jan. 9, 1917 |

(Other references on following page)

UNITED STATES PATENTS

| Number | Name | Date |
|---|---|---|
| 1,873,594 | Johnson | Aug. 23, 1932 |
| 1,903,958 | Clark | Apr. 18, 1933 |
| 2,301,669 | Richter | Nov. 10, 1942 |
| 2,341,907 | Cheetham | Feb. 25, 1944 |
| 2,392,105 | Sussman | Jan. 1, 1946 |

FOREIGN PATENTS

| Number | Country | Date |
|---|---|---|
| 569,661 | Great Britain | June 4, 1945 |
| 805,092 | France | Aug. 17, 1936 |

OTHER REFERENCES

Industrial and Engineering Chemistry, September 1941, pp. 1203–1212.

Angewandte Chemie, 52, No. 11, pp. 215–219.

Broderick, Carbonaceous Cation and Anion Exchangers in Water Treatment, Bureau of Mines Report of Investigation 3571, June 1941, page 2.